(12) United States Patent
LoPresti

(10) Patent No.: US 7,454,956 B1
(45) Date of Patent: Nov. 25, 2008

(54) HEAT EXCHANGER LEAK DETECTION USING MASS GAS FLOW METERING

(76) Inventor: William J. LoPresti, 904 Madison Grove La., Marietta, GA (US) 30064

( * ) Notice: Subject to any disclaimer, the term of this patent is extended or adjusted under 35 U.S.C. 154(b) by 303 days.

(21) Appl. No.: 11/231,912

(22) Filed: Sep. 22, 2005

(51) Int. Cl.
G01M 3/22 (2006.01)
F28D 3/02 (2006.01)

(52) U.S. Cl. .......................... 73/45.8; 73/49.2; 73/49.3; 165/11.1; 165/11.2; 165/71

(58) Field of Classification Search ............ 73/40–49.8; 165/11.1, 11.2, 70, 71
See application file for complete search history.

(56) References Cited

U.S. PATENT DOCUMENTS

| 4,492,113 A | 1/1985 | Weatherholt ................... 73/40 |
| 4,686,851 A * | 8/1987 | Holm et al. ................... 73/49.2 |
| 4,688,627 A * | 8/1987 | Jean-Luc et al. ............ 165/11.1 |
| 4,738,309 A * | 4/1988 | Schilling ..................... 165/144 |
| RE33,075 E | 10/1989 | Holm et al. ..................... 73/40 |
| 4,942,920 A | 7/1990 | Chalifoux et al. .......... 165/11.1 |
| 5,193,381 A * | 3/1993 | Heimann ..................... 73/49.7 |
| 5,412,978 A * | 5/1995 | Boone et al. ................. 73/49.2 |
| 5,705,737 A * | 1/1998 | Liao ............................ 73/49.7 |
| 5,835,976 A | 11/1998 | Kent et al. ................... 73/40.7 |
| 5,929,324 A | 7/1999 | Hu et al. ........................ 73/40 |
| 6,009,745 A * | 1/2000 | Shaw et al. .................. 73/40.7 |
| 6,035,700 A | 3/2000 | Shaw ............................ 73/40 |
| 6,062,068 A | 5/2000 | Bowling ........................ 73/40 |
| 6,314,794 B1 | 11/2001 | Seigeot ....................... 73/40.7 |
| 6,318,155 B1 * | 11/2001 | Carr ............................ 73/49.7 |
| 6,564,617 B1 * | 5/2003 | Araki .......................... 73/49.8 |
| 6,598,462 B2 * | 7/2003 | Williams ..................... 73/37.5 |
| 6,742,384 B2 | 6/2004 | Avila .......................... 73/40.7 |
| 6,851,316 B2 * | 2/2005 | Micke et al. ................. 73/40.7 |
| 6,923,043 B2 * | 8/2005 | Rabelle .................. 73/40.5 R |
| 6,938,675 B2 * | 9/2005 | Kokubunji et al. ......... 165/11.1 |
| 2003/0079857 A1 | 5/2003 | Mori et al. ................. 165/11.1 |
| 2005/0109083 A1 * | 5/2005 | Werner ....................... 73/40.7 |

* cited by examiner

Primary Examiner—David A. Rogers
(74) Attorney, Agent, or Firm—James Creighton Wray; Clifford D. Hyra

(57) ABSTRACT

Apparatus and methods for detecting leaks in a heat exchangers use mass gas flow metering. A regulated gas supply passes through a mass flow meter before entering either the product chamber or media chamber of a heat exchanger. The regulated gas supply passes into the heat exchanger through an inlet connection. All other inlets and outlets to the testing chamber are closed and isolated so that the chamber holds an applied pressure. The chamber on the opposite side of the heat exchanger is opened to atmosphere. Once gas fills the chamber and a static pressure is realized, the test begins by simply monitoring gas flow. If no flow is indicated, no flow rate is detected, and there is no detectable leak. Gas flow into the test chamber, at any given flow rate, as sensed by the sensitive mass flow meter, is an indication that leakage between the chambers exists.

27 Claims, 1 Drawing Sheet

HEAT EXCHANGER LEAK DETECTION USING MASS GAS FLOW METERING

BACKGROUND OF THE INVENTION

A wide variety of heat exchangers exist in the chemical, food, beverage, dairy, and pharmaceutical industries for cooling or heating various liquids. In a typical heat exchanger, heat energy is transferred between two fluids. A barrier separates the two fluids. The barrier may be a gasketed plate, a pipe, or a jacket. The barrier must maintain integrity and separate a product side chamber and a media side chamber. Leaks are undesirable and often dangerous.

Existing heat exchanger designs often employ a tube within a tube design, a tube bundle with multiple tubes attached to a tube sheet that is set in a shell, a spiral tube in a shell, or a design that uses multiple gasketed plates in a frame.

The basic concept of the plate and frame type heat exchanger is to pump fluids on either side of a thin metal plate so that heat may be transferred between the two fluids, e.g. the product and the media.

In all cases the integrity of the barrier and of the gasket material must be maintained.

As the heat exchangers are operated corrosion, erosion, thermal stress and gasket elastomer degradation result in leakage between the product chamber and media chamber. When leakage occurs during operation, a transfer of fluid from one chamber to the other occurs.

Often leaks become apparent only after the product has leaked into the media, or media into the product. If the latter occurs, it is likely that the adulterated product will be considered damaged. In some processes, such as those present in the food, beverage and dairy industries, contamination of this sort may have severe consequences. Heath risks may occur from contaminated products after the media flows into the product.

Needs exist for testing methods for heat exchangers that detect leaks before product or media becomes contaminated.

Current predictive measures usually involve disassembly for visual inspection and dye checking for holes or penetrations of any sort. Dye testing is a means of locating the position of the penetration, sometimes as small as a pinhole. This is generally done as part of routine maintenance procedure. Plates determined to be defective are discarded, and replacements are installed in the plate pack. Re-gasketing is usually done during these routine maintenance procedures.

There are two other common methods used to predict leaks without disassembly. One involves pressurizing one chamber with air and monitoring pressure loss. This method may work for large leaks, but is not practical for small leak determination.

Another method, used for small leak detection, uses a difference in conductivity between solutions that are pumped on each side of a heat transfer surface barrier. Analytical equipment detects conductivity increases in the low conductivity solution if a leak path exists. This method is costly to employ, and is far more complex than a mass flow rate detection method of testing.

Needs exist for methods of detecting leaks in heat exchangers that are inexpensive and do not require disassembly of the heat exchanger unit.

SUMMARY OF THE INVENTION

The present invention is an apparatus and method for detecting leaks in a heat exchanger using mass gas flow metering. Precise mass flow metering equipment is used to detect a separation breakdown between a product chamber and a media chamber in any type of heat exchanger that is used in a heating and/or cooling process. The present method of leak detection has several advantages over the procedures that are currently in use.

In the present invention, a regulated gas supply passes through a flow meter before entering either the product chamber or media chamber of a heat exchanger. The regulated gas supply passes through an inlet connection into the selected testing chamber of the heat exchanger. All other inlets and outlets to the testing chamber are closed off and isolated so that the tested chamber holds an applied pressure, which may be low. The chamber on the opposite side of the heat exchanger is opened to atmosphere.

Once gas fills the testing chamber and a static pressure is realized, the test begins by simply monitoring gas flow. If no flow is indicated and flow rate is detected, there is no detectable leak. Gas flow into the chamber, at any given flow rate, as indicated by the instrumentation, is an indication that leakage between the chambers exists.

The size of the leak is indicated by the rate of flow measured.

This testing method may be applied to all types of heat exchangers. In particular, the greatest benefit is realized in testing for leaks in plate heat exchangers. Leak testing is accomplished in a plate heat exchanger without the typical need to disassemble, and remove the plates or plate pack. Disassembly and removal of the plates or plate pack are highly labor intensive testing method.

These and further and other objects and features of the invention are apparent in the disclosure, which includes the above and ongoing written specification, with the drawings.

DETAILED DESCRIPTION OF THE PREFERRED EMBODIMENTS

Figure 1:
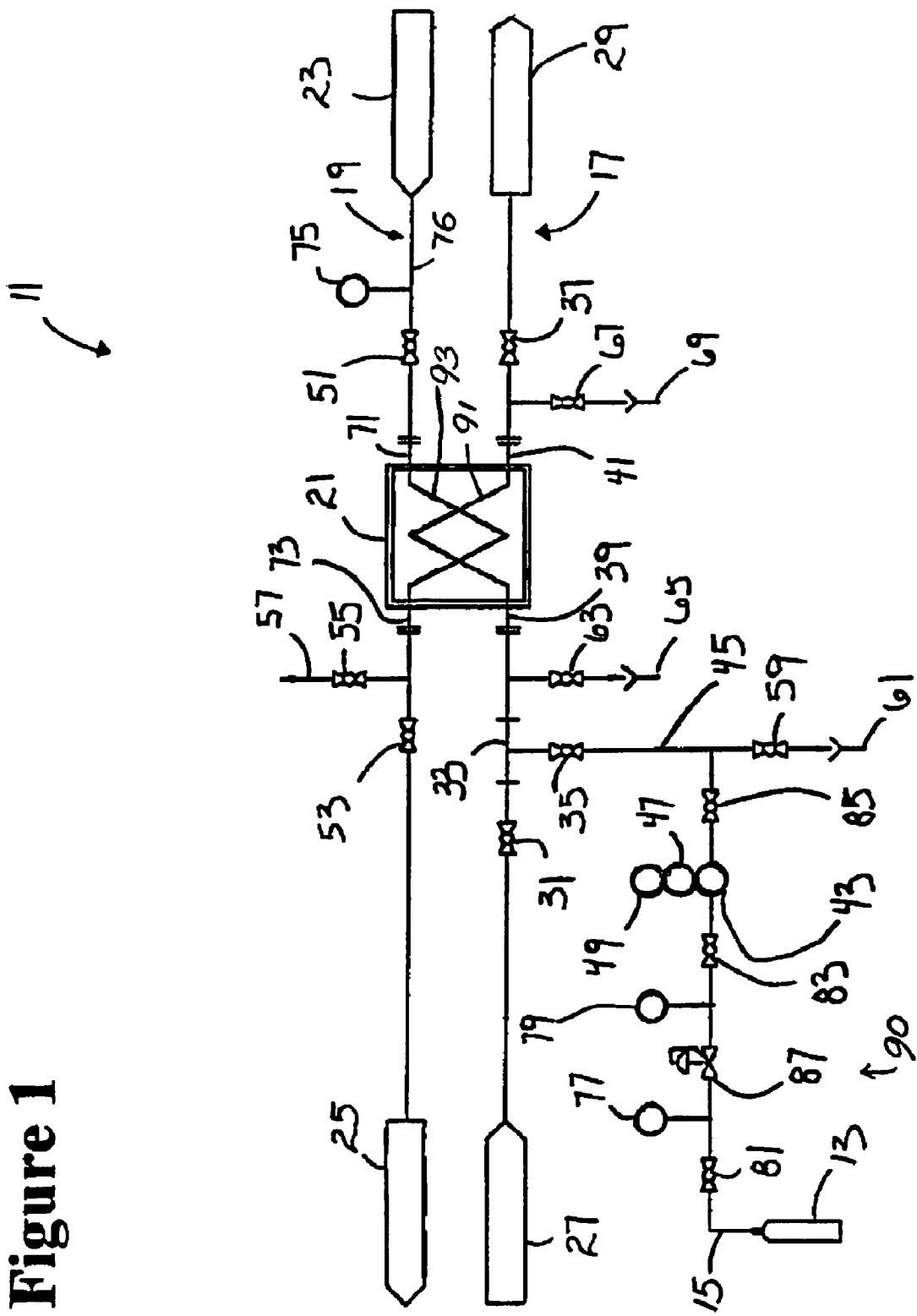
FIG. 1 is a schematic of the heat exchanger leak detection system.

The present invention provides new testing procedures for leak detection in heat exchangers.

The flow rate leak test method of the present invention is not designed to completely eliminate the current practice of disassembly and removal of plates for dye checking. The present invention does, however, provide a simple test method that eliminates the need to always disassemble and dye check a heat exchanger to determine if leakage exists. The equipment needed for the flow check test method of the present invention may be made portable for testing multiple units, or installed as a fixed dedicated unit. The flow meter installation may be permanent or temporary. When used as a predictive maintenance tool, this method of testing saves a great deal of unnecessary labor. The disassembling and removing of the plate pack is only necessary if a leak is detected.

The basic system components and procedures are summarized as follows.

FIG. 1 is a schematic of the heat exchanger leak detection system 11. A test gas 13 is applied 15 to either the product side 17 or the media side 19 of a heat exchanger 21. A media inlet 23 leads through the heat exchanger 21 to a media outlet 25. A product inlet 27 leads through a heat exchanger 21 to a product outlet 29.

For purposes of this description it is assumed that the product side 17 is to be tested. To test the media side 19, the components and procedures are reversed. To test the product side 17, valves 31, 37 are installed on the product side 17 to isolate the entire product compartment upstream and downstream so that no fluid displacement liquid or gas exists without a breakdown in the structural integrity of the barrier. Soft seat valves with a "bubble tight" shut-off are recommended. All valves must be "bubble-tight" shut-off capable. In lieu of isolation valves 31, 37 gasketed blanks, caps and spool piece connections may be used to ensure air tight isolation.

A tee 33 is installed in the pipeline upstream of product inlet port 39 of the heat exchanger 21. The tee 33 is isolated by a valve 35. A valve 37 downstream of the product exit port 41 is installed in the original heat exchanger product line or prior to the testing.

A regulated gas supply 13 is piped to provide flow through a low flow mass flow meter 43. The regulated gas supply 13 is then flowed into the branch side 45 of the tee 33. Because of the extremely low flow rate required, a thermal mass meter is a preferred meter 43; however, other metering devices are possible. The flow meter 43 may be relocated in a vent line. The meter 43 transmits a signal to a rate display 47 and a flow recorder 49, if desired. The test gas 13 is preferably, but not limited to, helium gas.

The heat exchanger 21 is completely drained of product and media fluids before testing. With all isolation valves 31, 37, 51, 53 closed, the test procedure begins by opening the valve 35 to allow gas to flow through the meter 43 and enter the heat exchanger 21. A valve 55 on the opposite side of the product chamber 17, in this example, the media chamber 19, is vented 57 to atmosphere. Once the product chamber 17 is pressurized, flow should cease if there are no leaks. The test involves monitoring and/or recording static conditions for any gas flow rate value. Sensors 77, 79 are located between valves on the gas supply feed 15.

Other components of the system include a drain valve 59 with a drain 61 in the tee inlet 45, a drain valve 63 with a drain 65 between the tee 33 and the product inlet port 39, and a drain valve 67 with a drain 69 between the product outlet port 41 and the isolation valve 37. A media inlet port 71 feeds into the heat exchanger 21 and a media outlet port 73 flows out of the heat exchanger 21. A temperature sensor 75 may be added on the media inlet line 76 from the media inlet 23.

Gas leakage causes penetration between the product side 17 and the media side 19. Therefore, if any flow rate is observed, a leak between the product and media is verified.

Should a leak be detected, disassembly and dye testing may follow. This test method can be used between product runs or after clean-up procedures to determine whether or not repairs are required.

A test may be performed on one chamber. It is not necessary to test both chambers. A test installation 90 may be permanently attached to the tee 33. Alternatively, a temporary test installation 90 may be coupled to the leg 45 of the tee 33 below the valve 35.

Before conducting the test, the heat exchanger 21 isolation valves 31, 37 and media valves 51, 53 are closed. Product fluids in the heat exchanger 21 are drained through drains 65, 69 by opening drain valves 63, 67 on opposite sides of the product chamber 91. media in a heat exchanger 21 media chamber 93 is drained by opening similar drain valves (not shown) connected to media inlet port 71 and outlet port 73. Vent valve 55 is opened to vent 57 the media chamber 93 and remains open during the testing. Test valve 85 remains closed. Drain valve 59 is opened to drain the tee 33 and test line 45 through the drain 61. Drain valves 59, 63 and 67 are closed. Isolation valves 33, 37, 51, 53 remain closed, and vent valve 55 remains open. Valves 83 and 85 are opened. Valve 35 remains open. Pressure regulator valve 87 is adjusted, and supply valve 81 is opened to supply test gas from the gas supply 13 through the supply line 15 to the pressure regulator valve 87. Pressure in the supply line 15 is sensed and measured by meter 77. Regulated pressure is sensed and measured by meter 79. When sensed, regulated pressure is sensed to be static by the pressure meter 79, readings are taken, displayed and recorded from the mass flow meter 43. The sensitive mass flow meter 43 senses no flow when the heat exchanger chambers are intact and no leakage occurs. The sensitive mass flow meter detects no mass flow. The display reads zero and the recorder records zero mass flow.

After testing is complete, the supply valve 81 is closed. The pressure regulator valve 87 is closed, and valves 83 and 85 are closed. Valve 59 is opened to vent the test gas and is closed after main test valve 35 is closed. Heat exchange isolation valves 31, 37, 51, 53 are opened, and the newly tested heat exchanger is placed online.

In the case of plate heat exchangers, this test serves as an excellent predictive maintenance tool. The present method results in labor savings because it eliminates the need for periodic disassembling of plates for inspection.

While the invention has been described with reference to specific embodiments, modifications and variations of the invention may be constructed without departing from the scope of the invention.

The invention claimed is:

1. A heat exchanger leak detection apparatus comprising:
a first inlet stream connected to a first inlet to a heat exchanger,
a first outlet stream connected to a first outlet from the heat exchanger,
a second inlet stream connected to a second inlet to the heat exchanger,
a second outlet stream connected to a second outlet from the heat exchanger,
isolation valves on each of the first inlet stream, first outlet stream, second inlet stream, and second outlet stream,
a vent in the second outlet stream,
a tee in the first inlet stream,
a valve in a branch of the tee for isolating a gas supply connected to the branch of the tee, and
a mass flow meter between the gas supply and the tee.

2. The apparatus of claim 1, wherein the heat exchanger leak detection apparatus is connectable to either a product side or a media side of the heat exchanger.

3. The apparatus of claim 1, wherein the heat exchanger is a plate heat exchanger.

4. The apparatus of claim 1, wherein the vent, the gas supply and the mass flow meter are portable and removable from the heat exchanger leak detection apparatus.

5. The apparatus of claim 1, wherein the vent, the gas supply and the mass flow meter are fixed and dedicated to the heat exchanger leak detection apparatus.

6. The apparatus of claim 1, wherein the valve in the branch of the tee is a bubble-tight shut-off.

7. The apparatus of claim 1, wherein the valve in the branch of the tee is a gasketed blank.

8. The apparatus of claim 1, wherein the valve in the branch of the tee is a cap and spool piece connection.

9. The apparatus of claim 1, wherein the mass flow meter is a thermal mass meter.

10. The apparatus of claim 1, further comprising a rate display and a flow recorder connected to the mass flow meter.

11. The apparatus of claim 1, wherein the gas supply comprises helium gas.

12. The apparatus of claim 1, further comprising drain valves and corresponding drains along the gas supply, inlet streams and outlet streams.

13. The apparatus of claim 1, further comprising sensors along the gas supply, inlet streams and outlet streams.

14. A heat exchanger leak detection method comprising:
providing a first inlet stream to a first inlet on a heat exchanger and a first outlet stream from a first outlet on the heat exchanger,
providing a second inlet stream to a second inlet on the heat exchanger and a second outlet stream from a second outlet on the heat exchanger,
providing isolation valves on the first inlet stream, second inlet stream, first outlet stream and second outlet stream,
providing a tee between the isolation valve on the first inlet stream the first inlet,
providing a valve on a branch of the tee,
draining the first inlet stream, second inlet stream, first outlet stream, second outlet stream and heat exchanger of fluids,
closing the isolation valves on the first inlet stream, second inlet stream, first outlet stream and second outlet stream,
venting the second outlet stream,
opening the valve on the tee,
flowing gas from a gas supply, through a gas supply stream, through the tee and into the first inlet stream,
measuring mass flow rate with a mass flow meter installed between the gas supply and the valve on the tee, and
detecting leaks in the heat exchanger.

15. The method of claim 14, further comprising testing either a product side or a media side of the heat exchanger.

16. The method of claim 14, wherein the heat exchanger is a plate heat exchanger.

17. The method of claim 14, wherein the vent in the outlet stream, the gas supply, the gas supply stream and the mass flow meter are portable and removable from the heat exchanger leak detection apparatus.

18. The method of claim 14, wherein vent in the outlet stream, the gas supply, the gas supply stream and the mass flow meter are fixed and dedicated to the heat exchanger leak detection apparatus.

19. The method of claim 14, wherein the mass flow meter is a thermal mass meter.

20. The method of claim 14, further comprising displaying a rate and recording flow from the mass flow meter.

21. A heat exchanger leak detection apparatus comprising:
a connector for connecting to one of the ports of a heat exchanger chamber,
isolation valves connected to inlet and outlet ports of one chamber of a heat exchanger,
a connector connected to the one chamber between the isolation valves,
a main test valve connected to the connector,
a test gas supply,
a supply valve connected to the supply,
a pressure sensor connected to the supply,
a mass flow sensor connected to the supply sensing mass flow after the pressure sensor senses a static pressure in the supply, and
a display connected to the mass flow sensor.

22. The apparatus of claim 21, further comprising a pressure regulator connected to the test gas supply.

23. The apparatus of claim 21, wherein the heat exchanger leak detection apparatus is permanently connected to a heat exchanger.

24. The apparatus of claim 21, wherein the heat exchanger leak detection apparatus is portable and detachably connected to a heat exchanger.

25. A method for testing heat exchangers for leakage comprising:
isolating a first chamber of a heat exchanger;
venting a second chamber of the heat exchanger;
draining the first chamber;
supplying a test gas under pressure to the first chamber; and
measuring the mass flow rate of the test gas with a mass flow sensor.

26. The method of claim 25, further comprising providing isolation valves on inlet outlet ports of one chamber of the heat exchanger.

27. The method of claim 26, further comprising closing the isolation valves supplying the test gas under pressure.

* * * * *